(12) United States Patent
Yan

(10) Patent No.: US 10,493,363 B2
(45) Date of Patent: Dec. 3, 2019

(54) REALITY-BASED VIDEO GAME ELEMENTS

(71) Applicant: Activision Publishing, Inc., Santa Monica, CA (US)

(72) Inventor: Paul D. Yan, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 15/347,596

(22) Filed: Nov. 9, 2016

(65) Prior Publication Data
US 2018/0126277 A1 May 10, 2018

(51) Int. Cl.
| A63F 9/24 | (2006.01) |
| A63F 13/655 | (2014.01) |
| A63F 13/25 | (2014.01) |
| A63F 13/52 | (2014.01) |
| A63F 13/35 | (2014.01) |
| A63F 13/335 | (2014.01) |
| A63F 13/803 | (2014.01) |
| A63F 13/216 | (2014.01) |
| A63F 13/213 | (2014.01) |

(52) U.S. Cl.
CPC .......... *A63F 13/655* (2014.09); *A63F 13/25* (2014.09); *A63F 13/335* (2014.09); *A63F 13/35* (2014.09); *A63F 13/52* (2014.09); *A63F 13/803* (2014.09); *A63F 13/213* (2014.09); *A63F 13/216* (2014.09)

(58) Field of Classification Search
CPC ......... A63H 17/00; A63H 30/04; A63F 13/42; A63F 13/803
See application file for complete search history.

(56) References Cited

U.S. PATENT DOCUMENTS

| 6,612,925 B1* | 9/2003 | Forsberg ............... A63F 13/10 434/62 |
| 7,731,588 B2* | 6/2010 | Templeman ........... A63F 13/00 446/454 |
| 9,155,967 B2* | 10/2015 | Koganezawa ....... G06T 19/006 |
| 9,251,603 B1* | 2/2016 | Kozko .................. G06T 11/00 |
| 9,704,298 B2* | 7/2017 | Espeset ............... G06T 19/006 |
| 2002/0032553 A1* | 3/2002 | Simpson ................ A63F 13/08 703/8 |
| 2003/0232649 A1* | 12/2003 | Gizis ...................... A63F 13/12 463/40 |
| 2004/0005927 A1* | 1/2004 | Bonilla ................. A63H 30/04 463/42 |
| 2005/0186884 A1* | 8/2005 | Evans ................... A63H 17/14 446/456 |
| 2006/0223637 A1* | 10/2006 | Rosenberg ............ A63F 13/10 463/47 |
| 2007/0197285 A1* | 8/2007 | Kamijo ................. A63F 13/10 463/31 |
| 2008/0311983 A1* | 12/2008 | Koempel ............... A63F 13/10 463/31 |
| 2009/0005167 A1* | 1/2009 | Arrasvuori .......... A63H 33/042 463/40 |

(Continued)

*Primary Examiner* — James S. McClellan
*Assistant Examiner* — Kevin M Carter
(74) *Attorney, Agent, or Firm* — Klein, O'Neill & Singh, LLP

(57) ABSTRACT

A videogame may make use of real world imagery for play of a video game utilizing a real world vehicle. Items may be identified in the real world imagery, and the identified items may become gameplay elements.

15 Claims, 7 Drawing Sheets

(56) References Cited

U.S. PATENT DOCUMENTS

| | | | | |
|---|---|---|---|---|
| 2010/0062817 A1* | 3/2010 | Seydoux | ................. | A63F 13/00 |
| | | | | 463/6 |
| 2010/0203933 A1* | 8/2010 | Eyzaguirre | ............ | A63H 13/10 |
| | | | | 463/2 |
| 2010/0258646 A1* | 10/2010 | Tamulewicz | ........... | A63H 18/02 |
| | | | | 238/10 B |
| 2010/0261526 A1* | 10/2010 | Anderson | ................ | G06F 3/016 |
| | | | | 463/31 |
| 2016/0243441 A1* | 8/2016 | Garbowski | ............ | A63F 13/358 |
| 2016/0310858 A1* | 10/2016 | Musliner | ............... | A63H 18/021 |
| 2016/0379415 A1* | 12/2016 | Espeset | ................... | G06T 15/04 |
| | | | | 345/633 |
| 2018/0085663 A1* | 3/2018 | Vlasak | ...................... | A63F 9/24 |

* cited by examiner

REALITY-BASED VIDEO GAME ELEMENTS

BACKGROUND OF THE INVENTION

The present invention generally relates to video games, and more particularly to video games making use of real-time real-world imagery.

Video games provide fun and enjoyment for many. Video games allow game players to participate in a variety of simulated activities. These simulated activities may include those that the game players may not be able or desire to experience directly, whether due to cost, danger, or equipment concerns, or simply due to inadequate time or ability to obtain sufficient proficiency in an activity.

Generally video games take place in a virtual world, with a user using a controller to control a virtual character of and interacting with the virtual world. Utilizing computer generated graphical displays, the virtual world may include a variety of fantastical structures and inhabitants, which may have fantastical characteristics and abilities.

Unfortunately, computer generated graphical displays may only approximate, if even closely, real world views. Moreover, conditions in the virtual world, as shown by the computer generated graphical displays, may not correspond with then-current conditions in a real world experienced by a user. While such may be an advantage at times, at other times a user may be inspired by or wish to experience then-current real world conditions within a game environment.

BRIEF SUMMARY OF THE INVENTION

Some aspects of embodiments in accordance with the invention include a method for use in providing videogame play, comprising: receiving, by a game device, video imagery from a camera of a vehicle; displaying the video imagery by the game device; receiving, by the game device, user inputs for operation of the vehicle; transmitting, by the game device, operation commands to the vehicle; and modifying a gameplay state based on information of the video imagery and the user inputs for operation of the vehicle.

Some aspects of embodiments in accordance with the invention include a system for providing for videogame play, comprising: a vehicle having a camera for generating video imagery; and a game device configured to command display of video imagery from the camera, to provide operation commands to the vehicle, and to provide for play of a videogame utilizing the video imagery.

These and other aspects of the invention are more fully comprehended upon review of this disclosure.

DETAILED DESCRIPTION

Figure 1:
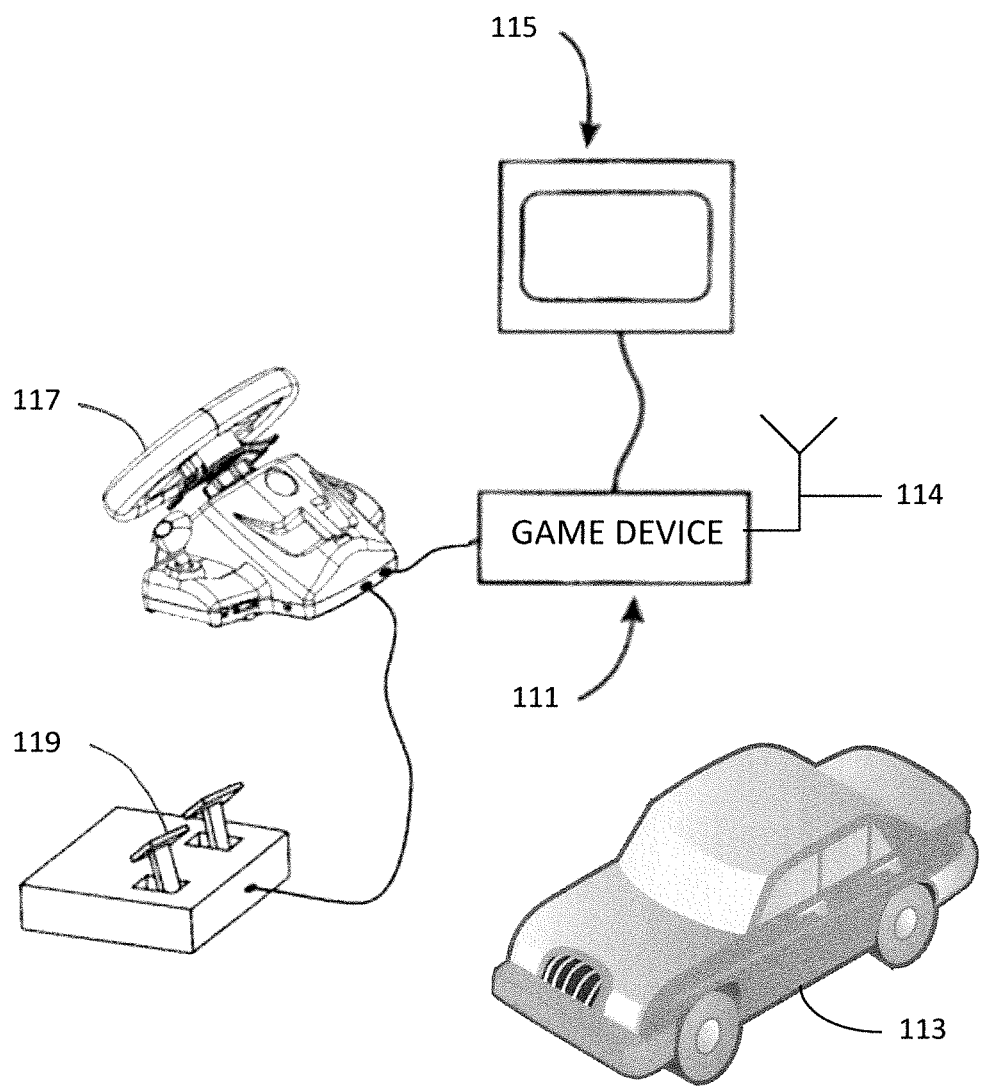
FIG. 1 illustrates a system in accordance with aspects of the invention.

FIG. 1 illustrates a system in accordance with aspects of the invention. The system includes a game device 111. The game device, in various embodiments, may be a game console, a personal computer, a tablet type device, or a smartphone. The game device is configured, through program instructions for example, to provide for play of a videogame. As illustrated in FIG. 1, the game device is coupled to a display device 115, although in various embodiments the display device may be incorporated in a housing of the game device. As illustrated in FIG. 1, the game device includes an antenna 114, with the game device also including wireless communication circuitry for communicating using the antenna. In various embodiments, however, the wireless communication circuitry and/or antenna may be external to the game device.

A vehicle 113 is in communication with the game device. In various embodiments, the vehicle is a remotely controlled vehicle. In some embodiments, and as illustrated for exemplary purposes in FIG. 1, the vehicle is an automotive vehicle. In some embodiments the vehicle may be an air vehicle. In some embodiments the vehicle may be a water vehicle. Although not visible in FIG. 1, the vehicle includes a camera. Video imagery from the camera is provided to game device, for example using wireless communication circuitry of the vehicle. In many embodiments the game device displays the video imagery as part of videogame play. In various embodiments the game device may modify the video imagery for display, for example by adding display of virtual objects or items for videogame play. In some embodiments the virtual objects or item may be displayed as overlays on the video imagery, and in some embodiments the virtual objects or items may be composited onto the video imagery. In some embodiments video composited onto the video imagery may be computer generated graphics.

In various embodiments the vehicle may include one or more sensors providing information regarding the vehicle's location, for example with respect to the vehicle's surroundings. In some embodiments the vehicle may include one or more infrared (IR) or other light sensors. The IR or other light sensors may detect, for example, objects in the immediate vicinity of the vehicle, providing information regarding the vehicle's location with respect to nearby objects. In some embodiments the vehicle may include radar, for example for object detection. In some embodiments the vehicle may include LIDAR, for example for obtaining information for mapping of surroundings of the vehicle. In some embodiments, the vehicle may include GPS circuitry, for example for determining locations of the vehicle. In some embodiments the vehicle may include some or all such components. In some embodiments the vehicle provides information from such sensors to the game device, for processing. In some embodiments the game device processes the information to develop a map of areas about the vehicle, and in some embodiments the game device locates position of the vehicle within the map. In some embodiments the game device provides the information to a server for such processing.

In many embodiments, the vehicle is controlled by commands issuing from the game device, although in some embodiments the commands may issue from a separate device, which in some embodiments may be independent of the game device. In some embodiments the commands may be from the game device, and based on controller inputs provided to the game device. In some embodiments the commands may also be based on gameplay status, either alone or in conjunction with the controller inputs. In the embodiment illustrated in FIG. 1, the controller inputs are from a steering wheel controller 117, and an accelerator/ brake controller 119. In various embodiments, however, the controller inputs may be from what may be considered a standard game controller, or from inputs available on or in a game device. In some embodiments the vehicle uses the commands to adjust or override autonomous vehicle behavior.

In operation, a user operates the controllers such that the game device provides commands to the vehicle to travel in various directions and/or at various speeds. The camera of the vehicle provides video imagery of the view from the camera to the game device. The game device uses the video imagery in providing videogame displays. In some embodiments the game device also uses information of the video imagery in providing game play elements in the videogame. The gameplay elements may be, for example, those things that relate to or are used as part of a world of videogame play.

In some embodiments the game device causes the video imagery to be displayed on the display device without modification. In some embodiments the game device causes the video imagery to be displayed on the display device with composited video and/or overlays, for example composited video or overlays relating to gameplay of a videogame. In some embodiments the composited video and/or overlays include in-game features of a virtual world of videogame play, superimposed on the video imagery from the camera of the vehicle. In some embodiments the in-game features of the virtual world include structures, objects, and/or characters of the virtual world. In some embodiments the composited video or overlays include in-game features showing activities that may occur during gameplay of the videogame, for example reflecting gameplay events. In some embodiments the activities that may occur during gameplay of the video game include temporary occurrences such as explosions, propelling of dirt, fire, and/or other activities. In some embodiments the composited video overlays may include dashboard type information for the vehicle, a miniature map of an area about the vehicle, and other features.

In some embodiments the game device identifies items in the video imagery, and includes the items in gameplay. For example, the video imagery may include items such as pylons, gates, rocks, other vehicles, and/or buildings. The game device may recognize those items, for example using video imagery analysis techniques, and incorporate those items into gameplay of the videogame. In some embodiments the game device may command display of composited video or overlays for identified items. For example, the game device may provide virtual effects to identified items. In some embodiments the virtual effects may be virtual customizations reflecting game play status of the identified items.

In some embodiments the game device may identify level lines in the video imagery, using either a grayscale analysis or a color based analysis, in identifying items in the video imagery. In some embodiments the game device may use other image analysis methods. In some embodiments a processor of the vehicle may identify, or partially identify, item in the video imagery using such methods, and provide results of the processing to the game device.

In some embodiments the game device may assign points to a user if the vehicle is directed towards the items. In some embodiments the game device may allow a user to take an action with respect to items, for example shooting the items, or crashing into the items, or circumnavigating the items, and to award points or other rewards for successful completion of the action. In some embodiments, for example, a reticle may be displayed over the video imagery, indicating a location of interest, for example an aim point for a weapon, projectile, or other locus of game action. Positioning of the reticle over game objects or items, whether in the video imagery or composited on or overlaid over the video imagery, alone or in conjunction with other operation of a game controller, may result in an increase in a user's score, or other result related to game play. For example, in some embodiments the reticle may be positioned over a game device controlled opposing character, with the game controller launching a virtual missile in response to game controller input. The game device may display flight of the missile on the display, for example using composited video or overlays, along with any resulting virtual explosion or virtual damage to objects or structures.

Figure 2:
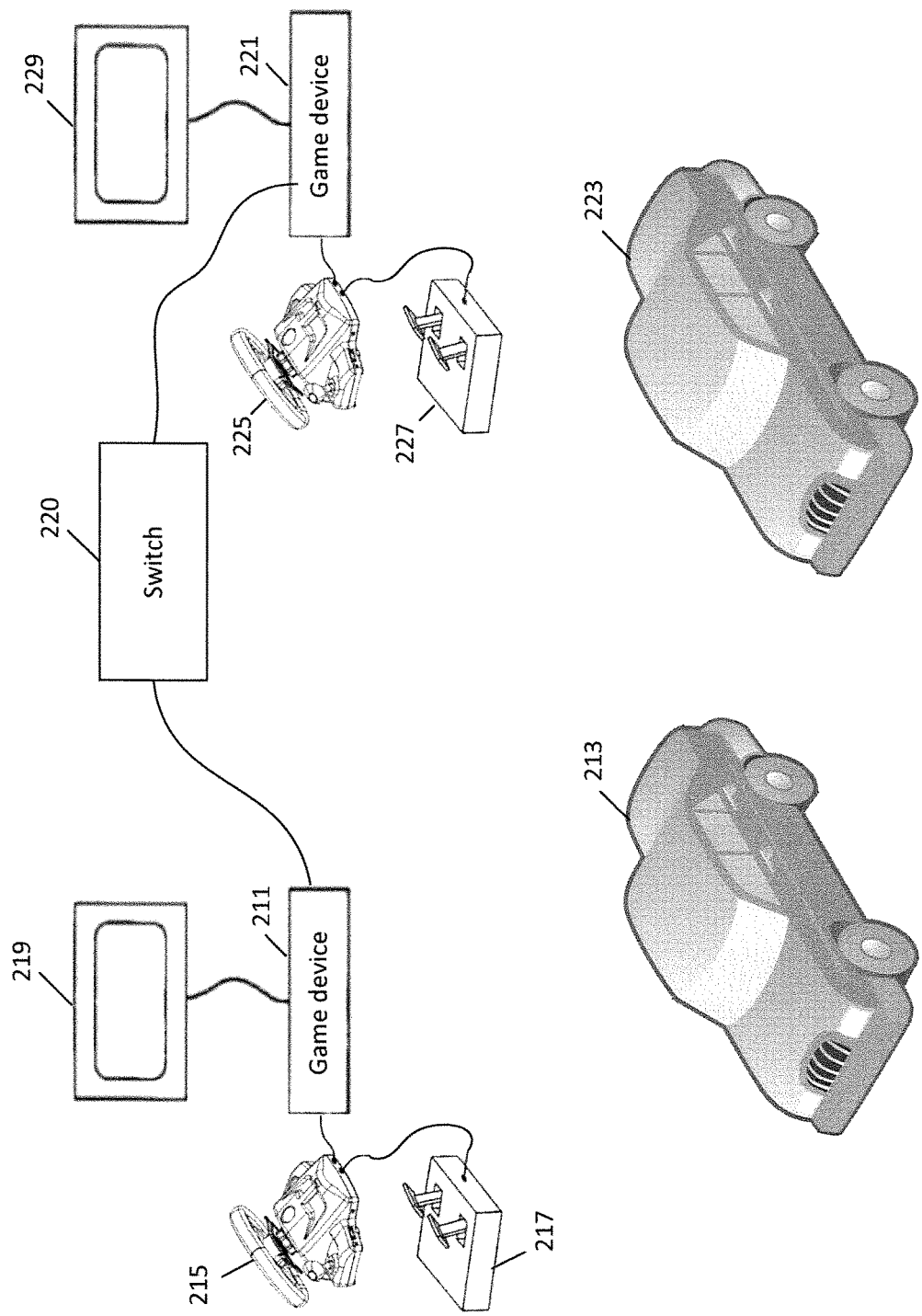
FIG. 2 illustrates a further system in accordance with aspects of the invention.

FIG. 2 illustrates a further system in accordance with aspects of the invention. Similar to the system of FIG. 1, the system of FIG. 2 includes a first game device 211 in communication with a first vehicle 213, with the first game device receiving inputs from first controllers 215, 217 for gameplay and vehicle control, and providing video imagery and gameplay overlays on a first display 219. In the system of FIG. 2, however, the first game device is in data communication with a second game device 221. The second game device, similar to the first game device, is in communication with a second vehicle 223, with the second game device receiving inputs from second controllers 225, 227 for gameplay and vehicle control, and providing video imagery and gameplay overlays on a second display 229.

In some embodiments, the first and second game devices may be in direct data communication with one another. In FIG. 2, however, the first and second game devices are shown to be in data communication by way of a switch 220. In some embodiments the switch may be in relatively close proximity to the first and second game devices, for example within 100 feet of those game devices in some embodiments, or within 25 feet of those game devices in some embodiments. In some embodiments the switch may be remotely located, in some part of the Internet for example, and in some embodiments the first and second game devices may be considered in data communication over the Internet. Moreover, in some embodiments some aspects of providing for videogame play may be provided by a server, with the first and second game devices receiving information regarding results of gameplay from the server, but without direct data communication between the first and second game devices.

As with the system of FIG. 1, in the system of FIG. 2 the game devices receive video imagery from cameras of their respective associated vehicles, and display the video imagery on their associated displays. Also as with the system of FIG. 1, the game devices may provide overlays over the video, and identify items in the video imagery and incorporate those items into gameplay.

In some embodiments the game devices may synchronize a start of gameplay between the two devices, for example with each device's associated vehicle being, reflecting, or used by a character in gameplay, and communicate score information between the devices. In some embodiments the game devices may in addition or instead share information regarding items identified in the video imagery. For example, in some embodiments, after a game device has identified an item in the video imagery, the game device may communicate information to the other game device such that the other game device may identify the same item if the same item appears in video imagery from that other game device's associated vehicle. In some embodiments game devices may share personalization features for in-game representations of vehicles. In some embodiments a game device may command display of composite video or overlays for other vehicles reflecting the personalization features, for example after identifying the other vehicles in the video imagery.

In some embodiments each game device may identify, in the video imagery, the vehicle associated with the other game device as an item and include that vehicle in gameplay. In some embodiments prior to or during gameplay, each player may cause the camera in their vehicle to include the other vehicle in the video imagery for that camera, and provide an input to the game device, for example using a controller, indicating that the video imagery includes the other vehicle. The game device may thereafter use information of that video imagery, or derived from that video imagery, in identifying the other vehicle in further video imagery. In some embodiments each vehicle may include unique, or semi-unique, identifiers for use in identification. For example, in some embodiments the vehicles may include numeric identifiers, bar codes, QR codes, or some other pattern or image on an exterior surface of the vehicle. In some embodiments the image may be that of a person, or a portion of a person, for example a face of a person. In some embodiments the vehicles may include one or more lights, for example LEDs. The lights may be of different colors, and/or the lights may be arranged in an identifiable array or pattern, to allow for identification of vehicles.

Figure 3:
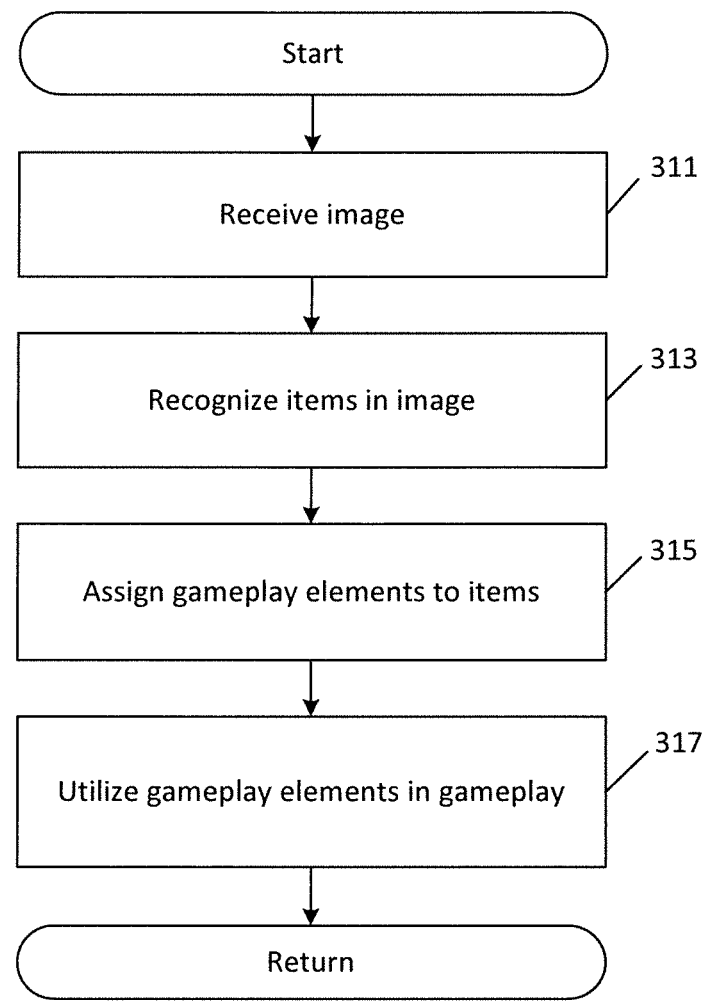
FIG. 3 is a flowchart of a process useful in providing video gameplay in accordance with aspects of the invention.

FIG. 3 is a flowchart of a process useful in providing video gameplay in accordance with aspects of the invention. In some embodiments the process is performed by the system of FIG. 1 or FIG. 2. In some embodiments the process is performed by a game device, for example the game device of FIG. 1 or the first game device or the second game device of FIG. 2. In some embodiments the process is performed by a processor of a game device, and in some embodiments the processor executes program instructions to perform the process.

In block 311 the process receives a video image. In many embodiments the video image is from a camera of or mounted to a vehicle. The vehicle may be a vehicle such as discussed with respect to FIG. 1 or FIG. 2. In many embodiments the video image is a video image from a sequence of video images forming video imagery.

In block 313 the process identifies items in the video image. In some embodiments the items are objects visible in the video image. In some embodiments the objects include other vehicles. In some embodiments the process identifies items in the video image based on level lines in the image. In some embodiments the process identifies items in the video image by comparing information of the video image with a library of information about potential objects. In some embodiments the process identifies items using other image analysis techniques.

In block 315 the process assigns gameplay elements to one, some, or all of the identified items. In some embodiments the process assigns gameplay elements to the identified items by allowing a user operating the vehicle to take an action with respect to the item. In some embodiments the action is directing the vehicle towards the item. In some embodiments the action is circumnavigation of the item. In some embodiments the action is shooting the item. In some embodiments the action is crashing into the item.

In block 317 the process utilizes the gameplay elements in providing gameplay of the videogame. In some embodiments the process displays the video imagery from the camera of the vehicle along with an overlay for gameplay elements as part of providing gameplay. In some embodiments the process changes a gameplay status on the occurrence of a predefined action taken with respect to the gameplay element. In some embodiments the change to gameplay status is a change to gameplay score for the user. In some embodiments the change to gameplay status is reflected in composited video and/or an overlay over or about the item in the video imagery. In some embodiments the change to gameplay status is a change to the gameplay element that persists when the gameplay element is not in a field of view of the camera. In some embodiments the process maintains an indication of location of the gameplay element within a world of gameplay, and uses the indication of location within the world of gameplay as part of identifying the gameplay element, and uses that identification of the gameplay element in maintaining status of the gameplay element. In some embodiments the process utilizes unique or semi-unique visual aspects of an identified item in maintaining status of the gameplay element. In some embodiments the process additionally adds gameplay elements that do not correspond to items in the video imagery. In some embodiments the gameplay elements may be virtual game characters controlled by the game device, rather than by a user using the game device. In some embodiments the gameplay elements may be virtual objects, structures, or devices. For example, in some embodiments the gameplay element may be a gate, which may be in an open or closed state depending on gameplay activity. In some embodiments the process maintains a record of relative positions of gameplay elements in a virtual world by creating and/or maintaining a map of locations and items in the gameplay world. The process thereafter returns.

Figure 4:
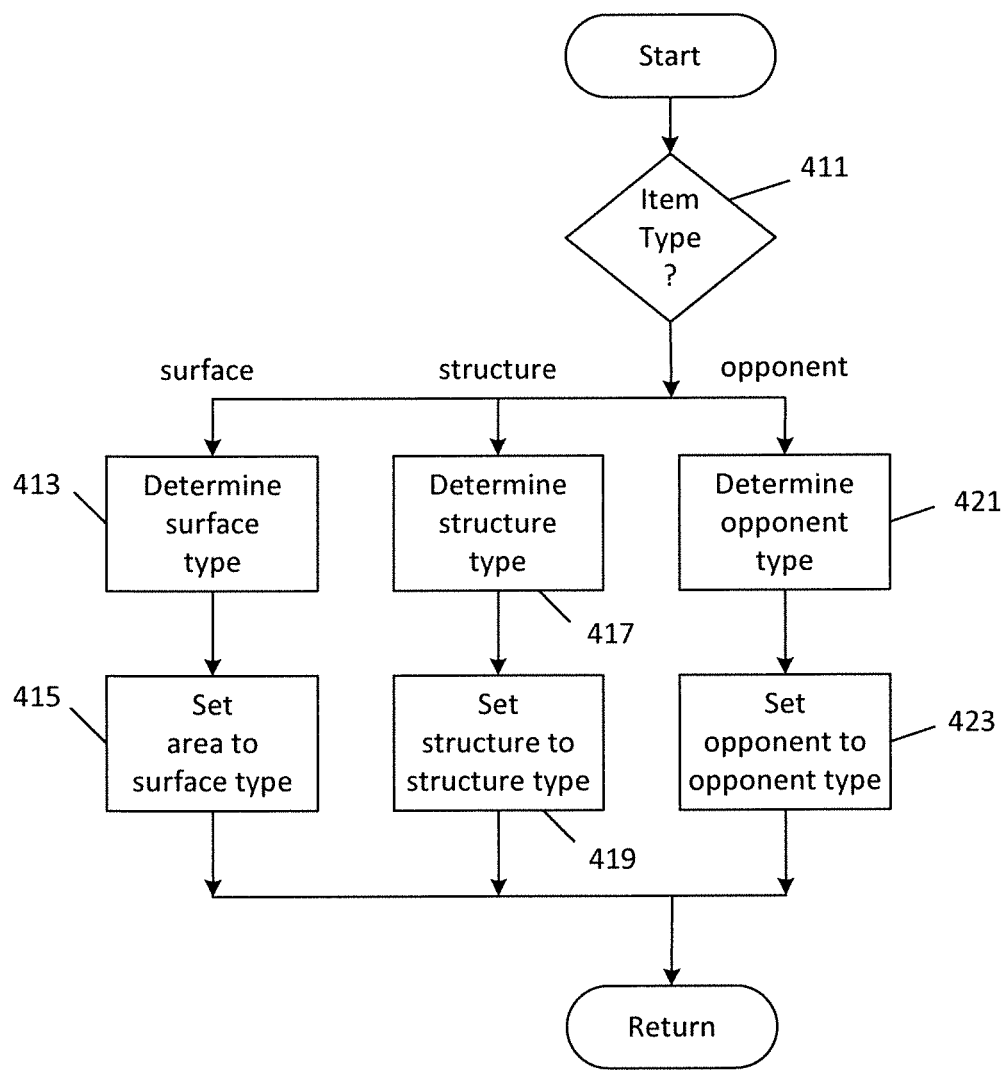
FIG. 4 is a flowchart of a further process useful in providing video gameplay in accordance with aspects of the invention.

FIG. 4 is a flowchart of a further process useful in providing video gameplay in accordance with aspects of the invention. In some embodiments the process of FIG. 4 performs operation of block 315 of the process of FIG. 3. In some embodiments the process is performed by the system of FIG. 1 or FIG. 2. In some embodiments the process is performed by a game device, for example the game device of FIG. 1 or the first game device or the second game device of FIG. 2. In some embodiments the process is performed by a processor of a game device, and in some embodiments the processor executes program instructions to perform the process.

In block 411 the process determines an item type for a recognized item. In some embodiments the item type may be one of a surface, a structure, or an opponent. If the item type is a surface, the process proceeds to block 413. If the item type is a structure, the process proceeds to block 417. If the item type is an opponent, the process proceeds to block 421.

In block 413 the process determines a surface type. For example, the surface may be a grass surface, an asphalt or concrete surface, a gravel surface, a dirt surface or some other surface.

In block 415, the process sets an area of a gameplay world to the surface type. In some embodiments, a user's score may be affected upon entry of the vehicle associated with the user onto the surface. For example, in some embodiments, a user's score may be reduced if the vehicle enters a surface of the grass type. For example, in some embodiments commands from the game device to the vehicle may be modified upon entry of the vehicle associated with the user onto the surface. For example, in some embodiments vehicle change of direction commands may be delayed and/or vehicle speed commands may be reduced if the vehicle is on a gravel type surface. In some embodiments a particular surface, or portion of a surface, may have particular gameplay characteristics. For example, in some embodiments a surface or portion of a surface may provide for "powerups" upon arrival of a vehicle at the portion of the surface. In some embodiments such game play features may be intermittent or timed during gameplay, and display of availability of, for example, powerups may depend on gameplay events. Moreover, in some embodiments, game devices may communicate status of availability of, for example, powerups, so as to provide for synchronization between game devices.

In block 417 the process determines a structure type. For example, the structure may be a pylon, a gate, a fence, a building, or some other structure.

In block 419 the process sets an area of the gameplay world to the structure type. In some embodiments a user's score may be affected if the vehicle associated with the user is navigated in a predefined way with respect to the structure type, or if the user takes other action, for example using a game controller, with respect to the structure. For example, in some embodiments a user's score may be increased if the vehicle associated with the user circumnavigates structures of the pylon type, and may be reduced if the vehicle associated with the user strikes structures of the pylon type. Similarly, in some embodiments the user's score may be increased if the vehicle associated with the user is navigated into a structure of the gate type. Also for example, in some embodiments the user's score may be increased if the user utilizes the game controller to command a shot to a structure of a building type.

In block 421 the process determines an opponent type. For example the opponent may be another vehicle, or a specific type of vehicle, or some other opponent.

In block 423 the process sets characteristics of the opponent based on the opponent type. For example, in some embodiments the process sets characteristics relating effects on a user's score or vehicle operation in the event the user's vehicle strikes the opponent.

The process thereafter returns.

FIGS. 5A-5D show screenshots of videogame play in accordance with aspects of the invention. The screenshots include video imagery from a camera of a vehicle, and may also show overlay features provided as part of video gameplay.

Figure 5A:
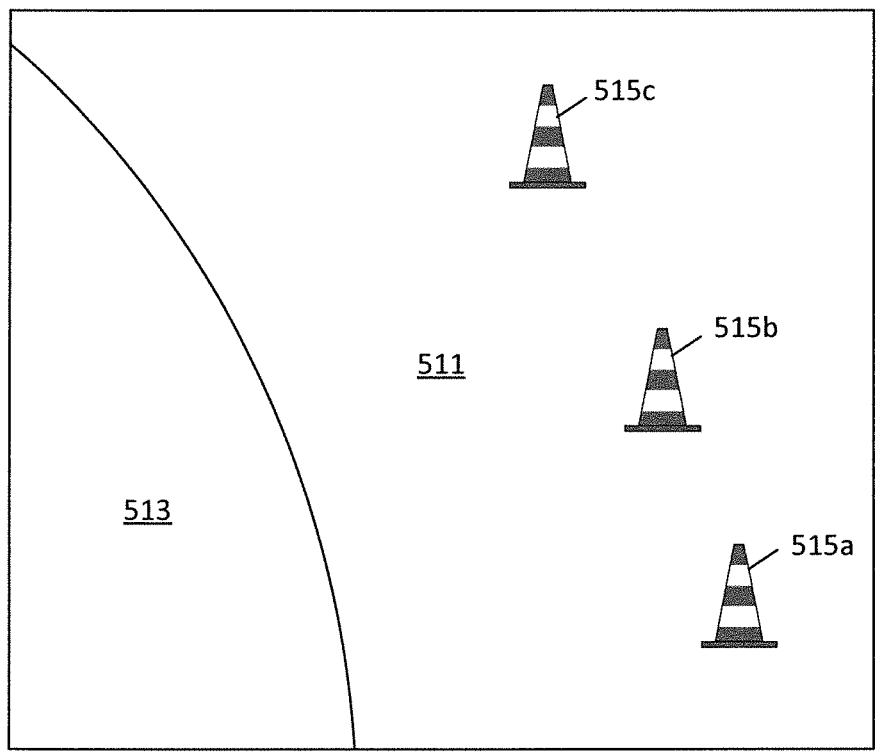
FIGS. 5A-D show screenshots of videogame play in accordance with aspects of the invention.

The screenshot of FIG. 5A shows a surface area that includes a portion of an asphalt raceway 511, bounded on an inner side by a dirt infield 513. Pylons 515a-c are present in the asphalt raceway, defining a portion of the raceway in which driving is to be performed. The view is that from a camera of a vehicle, for example as discussed herein. During videogame play, a game device, for example a game device as discussed with respect to FIG. 1 or 2, identifies the dirt infield, the asphalt raceway, and the pylons, and assigns gameplay elements to those features. In some embodiments, for example, a user's score may be reduced if the vehicle strikes the pylons, and user commands to increase vehicle speed may be delayed if the vehicle is on the dirt infield.

Figure 5B:
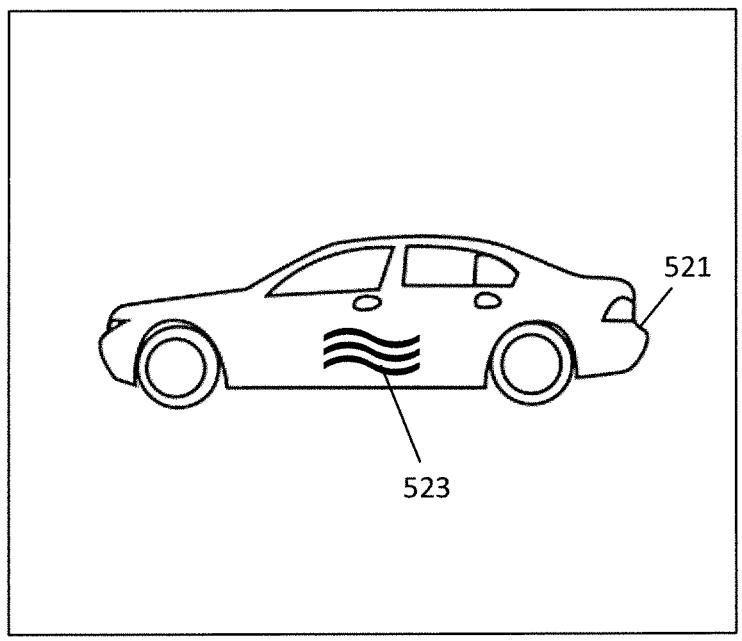

The screenshot of FIG. 5B shows a vehicle 521. The vehicle may be an opponent's vehicle, for example as discussed with respect to FIG. 2. The vehicle, as displayed, includes markings 523 that are not present in the actual vehicle, but are composited onto video imagery used for display.

Figure 5C:
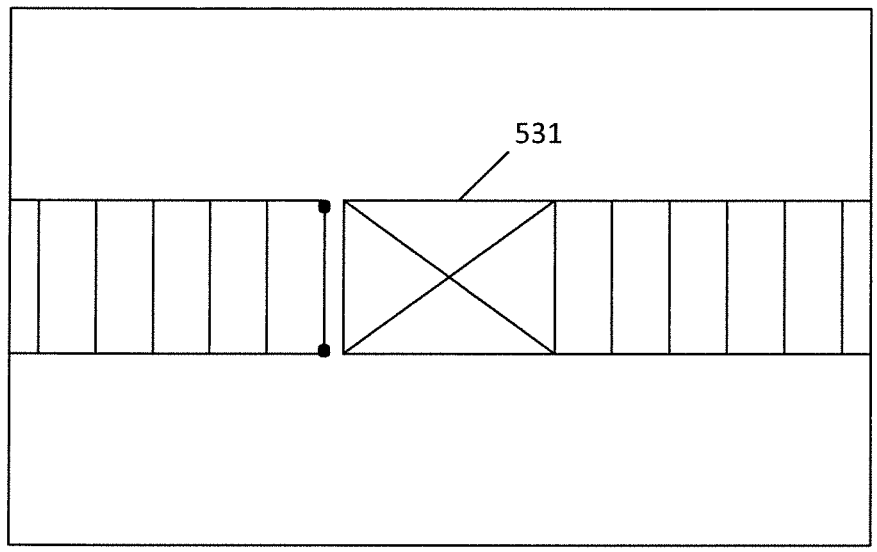
Figure 5D:
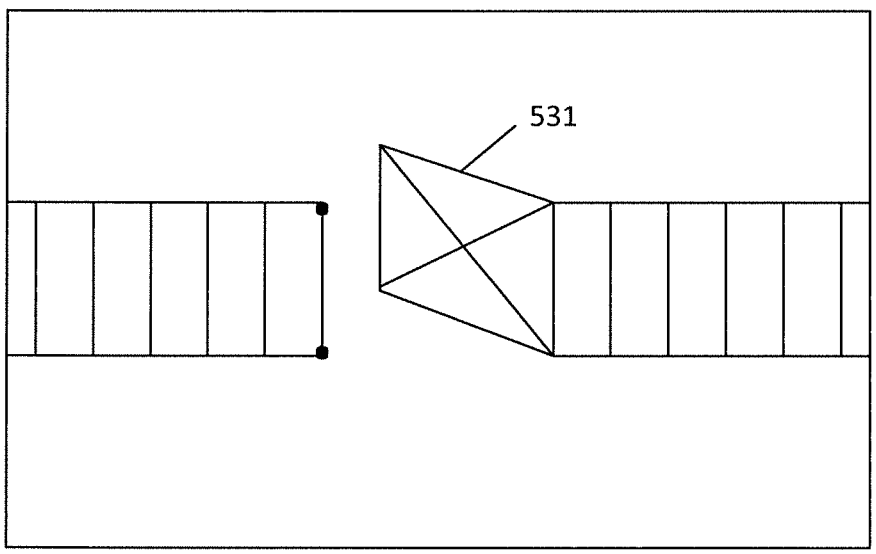

The screenshot of FIG. 5C shows a gate 531 blocking access to an area. The screenshot of FIG. 5D shows the gate of FIG. 5C, after a user's vehicle has passed through an area on which the gate is located. In some embodiments the gate is a virtual gate. In some embodiments a game device is programmed to open the virtual gate upon a first gameplay event, and maintain that state until occurrence of a second gameplay event. In some such embodiments the game device may provide commands to the user's vehicle to not allow the user's vehicle to pass through a real world location corresponding to a virtual location of the gate when the virtual gate is closed. For example, the game device may command braking or otherwise stopping of the vehicle if the vehicle approaches the gate location and the gate is closed.

Although the invention has been discussed with respect to various embodiments, it should be recognized that the invention comprises the novel and non-obvious claims supported by this disclosure.

What is claimed is:

1. A method for use in providing videogame play of a videogame, comprising:
   receiving, by a game device, video imagery from a camera of a vehicle;
   displaying the video imagery by the game device;
   receiving, by the game device, user inputs for operation of the vehicle;
   transmitting, by the game device, operation commands to the vehicle;
   modifying a gameplay state of the videogame based on information of the video imagery and the user inputs for operation of the vehicle, including determining types of surfaces for areas of the gameplay world by comparing information of the video imagery with a library of information about potential types of surfaces and modifying the gameplay state of the videogame based on a type of surface identified in the video imagery upon which the vehicle is located;
   identifying items in the video imagery and assigning gameplay elements of the videogame to at least some of the items; and
   modifying display of the at least some of the items in the video imagery identified as gameplay elements of the videogame based on gameplay status of the at least some of the items.

2. The method of claim 1, further comprising modifying display of the video imagery to reflect gameplay events of the videogame by compositing video on the video imagery.

3. The method of claim 1, wherein the operation commands are based on the user inputs for operation of the vehicle.

4. The method of claim 1, wherein at least some of the operation commands are based on the user inputs for operation of the vehicle and the gameplay state of the videogame.

5. The method of claim 1, further comprising:
   receiving, by the game device, information regarding location of the vehicle; and
   using the information regarding location of the vehicle to maintain information regarding location of items in the video imagery.

6. A system for providing for videogame play of a videogame, comprising:
   a vehicle having a camera for generating video imagery; and
   a game device configured to command display of video imagery from the camera, to provide operation commands to the vehicle, and to provide for videogame play of a videogame utilizing the video imagery wherein to provide the videogame, the game device is configured to:
      determine a type of a surface upon which the vehicle is located from the video imagery from the camera by comparing information of the video imagery with a library of information about potential types of surfaces;

modify a gameplay state of the videogame based on the type of surface upon which the vehicle is located;
identify items in the video imagery;
assign gameplay elements to at least some of the identified items; and
command modification of display of the at least some of the identified items assigned gameplay elements based on gameplay status of the at least some of the identified items.

7. The system of claim 6, wherein at least some of the operation commands are based on user inputs for controlling the vehicle.

8. The system of claim 7, wherein at least some of the operation commands are based on status of videogame play of the videogame.

9. The system of claim 6, wherein the game device is further configured to command modification of display of the video imagery from the camera.

10. The system of claim 9, wherein the game device is configured to command modification of display of the video imagery from the camera based on gameplay status of the videogame.

11. The system of claim 6 further comprising:
a steering wheel controller connected to the game device;
an accelerator/brake controller connected to game device; and
wherein the steering wheel controller and the accelerator/brake controller provide user inputs to the game device.

12. The system of claim 6 wherein the video imagery includes an asphalt raceway, a dirt infield, and pylons and the game device identifies the asphalt raceway, dirt infield, and pylons and assigns the asphalt raceway, dirt infield, and pylons as gameplay elements in the videogame.

13. The system of claim 6, wherein the game device is further configured to communicate information about at least one identified item to a second game device for use in identifying the at least one identified item in video imagery from a second vehicle by the second device.

14. The system of claim 6 wherein the game device is further configured to change the operation commands based upon the type of surface.

15. The system of claim 6 wherein a score of a user is affected by an action taken by the user in relation to the identified surface type.

\* \* \* \* \*